United States Patent [19]

Ebner

[11] 3,867,524

[45] Feb. 18, 1975

[54] METHOD OF TREATING PERIODONTAL DISEASE

[75] Inventor: Norbert Ebner, Radenthein, Austria

[73] Assignee: U.S. Philips Corporation, New York, N.Y.

[22] Filed: Mar. 29, 1973

[21] Appl. No.: 346,079

Related U.S. Application Data

[63] Continuation of Ser. No. 205,347, Dec. 6, 1971, abandoned.

[52] U.S. Cl. .............................................. 424/180
[51] Int. Cl. ........................................... A61k 27/00
[58] Field of Search ................................... 424/180

[56] References Cited

UNITED STATES PATENTS

| | | | |
|---|---|---|---|
| 2,139,139 | 12/1938 | Tompkins | 424/180 |
| 3,272,705 | 9/1966 | Petuely | 424/180 |

*Primary Examiner*—Richard L. Huff
*Attorney, Agent, or Firm*—Frank R. Trifari; Norman N. Spain

[57] ABSTRACT

Lactulose has been found to be effective in the treatment of periodontal disease.

7 Claims, No Drawings

METHOD OF TREATING PERIODONTAL DISEASE

This is a continuation of application Ser. No. 205,347, filed Dec. 6, 1971 and now abandoned.

The invention relates to a new and novel method for the treatment of mammals suffering from periodontal disease.

Periodontal disease is an affection of the set of teeth and the gums of mammals. Symptoms of the disease are swollen and bleeding gums, deepened tooth pockets, loosening of the teeth giving rise to loss of teeth, often accompanied by a puslike secretion from the tooth pockets. Manifestations of the disease are called pyrrhoea alveolaris, gingivitis and periodontitis. In German literature periodontal disease is called "Parodontopathie" or "Paradentose."

The treatment of the disease consisted up to now mainly in removing of the scale, massage of the gums and brushing of the teeth with tooth-paste. This treatment however appeared to be highly unsatisfactory in many occasions.

It is a principle object of this invention therefore to provide a new and effective treatment for mammals suffering from periodontal disease.

This as well as other objects of the invention will be apparent from the description that follows.

According to the invention it has now been found that mammals suffering from periodontal disease may be in many cases successfully treated by the oral administration of lactulose in a small but effective amount. It has been found that the oral administration of lactulose in amounts of from about 6 to about 30 grammes daily is an effective means of treating grown-up humans suffering from periodontal disease. Children are treated with one half to one third of this dose. Generally grown-ups are treated with a daily dose of about 10 grammes of lactulose. A considerable improvement of the condition generally is seen within 2 to 3 weeks.

It is known that lactulose can also be used for the treatment of constipation. The preferred doses of 10 grammes daily to be administered in carrying out the method of this invention, however, generally will not give rise to diarrhoea. As the amount of lactulose causing diarrhoea rather strongly differs from patient to patient, it will be possible to treat patients severely suffering from periodontal disease with the higher doses within the range above specified without causing diarrhoea. In the case of prescribing such higher doses, it is to be preferred to divide the daily dose into two or three parts.

The lactulose may be administered in solid form either alone or mixed with one or more carriers such as glucose, galactose or lactose. However, a very satisfactory method is to administer the lactulose in the form of a syrup, for example one containing about 50 percent by weight of lactulose, about 5 percent by weight of lactose, about 8 percent by weight of galactose and the remainder water. This composition is called hereinafter "Duphalac."

A dry composition may contain about 40 percent by weight of lactulose, about 4 percent by weight of lactose, about 6 percent by weight of galactose and the remainder dextrine maltose.

The lactulose may also be administered contained in gelatine capsules, each containing 2 to 3 grammes of lactulose.

The lactulose may alternatively be worked into confectionery, candies, jelly drops, gum drops etc. each containing 3 to 5 grammes of lactulose. Colouring agents admitted for drugs, conserving agents such as sorbic acid and its salts, jellifying agents such as pectine, thickening agents such as tragacanth gum, arabic gum and carboxy methylcellulose, flavouring agents such as citric acid and tartaric acid may be employed.

Chewing gums containing ½ to 2 grammes of lactulose per piece may be prescribed in the case patients have no loosened teeth.

The invention will now be described in greater detail with reference to the following examples.

1. A 19 year old man suffering from periodontal disease for three years had swollen and bleeding gums of both upper and lower jaw.

He was treated with 15 mls of "Duphalac" (1 ml = 1,33 grammes) taken orally once daily in the morning during 8 weeks. No other treatment was given. Also no change in living or dietary habits was prescribed. After 3 weeks of treatment an almost complete healing had occurred both subjectively and objectively. The swellings of the gums had disappeared and the bleedings stopped.

2. A 24 year old man who suffered from periodontal disease for 18 months, having gum swellings and bleedings of the upper as well as of the lower jaw, with pus-like excretion in the lower jaw was treated with "Duphalac."

He was, without any other treatment or change in his living or dietary habits, given 15 mls of "Duphalac" orally once a day in the morning.

After 3 weeks of treatment an obvious improvement was noticed both in upper and lower jaw gingivae. The pus-like secretation had practically disappeared, the bleedings had completely stopped and the swellings of the gums were markedly reduced.

3. An 18 years old woman suffered from periodontal disease for two years. Her gingiva showed a severe redness, swellings and bleedings. She had developed deepened tooth pockets, a pus-like secretion coming out of them.

Attempts made by her dentist to treat her disorder by massage remained without any effect.

The patient was put on "Duphalac" without any local treatment. The dosage was 15–22 mls taken once daily in the morning.

After 6 weeks a complete restitution of the gingivae had occurred. No pus-like secretion or gum bleeding could be observed.

4. A woman 26 years old had suffered from periodontal disease for 6 years. Her gums showed a severe redness and swelling. A pus-like secretion was noticed from the tooth pockets in the lower jaw. The incisive teeth of the lower jaw showed a marked loosening.

She was given 15 to 22 mls of "Duphalac" orally once daily in the morning during 6 weeks. Then redness, swelling as well as pus-like secretion were remarkedly reduced. The loosened teeth had more consolidated. After the treatment had been continued for 4 weeks the gingivae were normal, the looseness of the teeth of the lower jaw had completely disappeared.

5. A 19 year old man had been suffering from periodontal disease since childhood. Due to his chronic illness he had lost all teeth of the upper jaw. The patient had only eight frontal teeth of the lower jaw left. The gums adjoining these teeth showed redness, swellings and bleedings.

Without any other treatment the patient was put on 15 mls of "Duphalac" orally once daily in the morning.

A remarkable improvement after 3 weeks could be observed, and nearly complete restitution to normal was seen after 8 weeks.

6. A 19 year old man had suffered from periodontal disease for 5 months. Redness, swellings and secretion from the gums was observed, especially of the gum of the right half of the lower jaw.

The patient was put on 15 mls of "Duphalac" orally once daily in the morning. There was no other treatment.

After 3 weeks the maxillar and the left mandibular gingiva were completely restored. A marked improvement of the right mandibular gingivae was also noticed.

7. A man 29 years old suffered from periodontal disease since he was 11 years old. Especially the frontal parts of the maxilla as well as of the mandibula were affected. Very severe bleedings occurred after the slightest trauma, not only after tooth-brushing, but also on eating. The gums were markedly swelled.

After having been put on 15 mls of "Duphalac" taken orally once a day in the morning for 3 weeks — a nearly complete restitution of the gingivae was seen. The bleedings had completely stopped. After 8 weeks of treatment the gingivae were totally healed and had a healthy look.

In none of these cases any side effect of the drug including diarrhoea was seen.

While the invention has been described in connection with specific embodiments and applications, other modifications thereof will be readily apparent to those skilled in the art without departing from the spirit and the scope of the invention as defined in the appended claims.

What is claimed is:

1. A method of treating periodontal disease in humans suffering from said disease which method comprises administering to said humans from about 2 to 30 grams of lactulose daily.

2. The method of claim 1 wherein lactulose is administered in the form of a syrup containing about 50 percent by weight of lactulose, about 5 percent by weight of lactose, about 8 percent by weight of galactose and the remainder water.

3. The method of claim 1 wherein the lactulose is administered in the form of a dry composition containing about 40 percent by weight of lactulose, about 4 percent by weight of lactose, about 6 percent by weight of galactose and the remainder dextrine maltose.

4. The method of claim 1 wherein lactulose is administered to grown-up humans daily in an amount ranging from about 6 grammes to about 30 grammes.

5. The method of claim 4 wherein lactulose is administered daily in an amount of about 10 grammes.

6. The method of claim 1 wherein lactulose is administered to children daily in an amount ranging from about 2 to about 15 grammes.

7. The method of claim 6 wherein lactulose is administered to children daily in an amount ranging from about 3,5 to about 5 grammes.

* * * * *